(12) United States Patent
Kojima

(10) Patent No.: US 6,290,291 B1
(45) Date of Patent: Sep. 18, 2001

(54) ADJUSTABLE BICYCLE SADDLE

(75) Inventor: Masao Kojima, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/697,142

(22) Filed: Oct. 27, 2000

(51) Int. Cl.$^7$ ..................................................... B62J 1/00
(52) U.S. Cl. .................................... 297/201; 297/452.4
(58) Field of Search .............................. 297/195.1, 201, 297/202, 452.4

(56) References Cited

U.S. PATENT DOCUMENTS

| | | | | |
|---|---|---|---|---|
| 619,204 | * | 2/1899 | Moore | 297/201 |
| 622,357 | * | 4/1899 | Hitchcock et al. | 297/201 |
| 629,956 | * | 8/1899 | Craig | 297/201 |
| 633,487 | * | 9/1899 | Radenmacher | 297/201 |
| 694,875 | * | 3/1902 | Mergham | 297/201 |
| 872,124 | * | 11/1907 | Hammaren | 297/201 |
| 5,352,016 | * | 10/1994 | Hobson | 297/201 |

FOREIGN PATENT DOCUMENTS

23677 * 3/1902 (GB) ................................. 297/201

* cited by examiner

*Primary Examiner*—Peter R. Brown
(74) *Attorney, Agent, or Firm*—Shinjyu Global IP Counselors, LLP

(57) ABSTRACT

An adjustable bicycle saddle is provided with a saddle base (attachment member) and first and second saddle portions that are movably coupled relative to the saddle base between at least two different locations to change the effective transverse width of the saddle. Accordingly, the adjustable bicycle saddle can be adjusted to be wider or narrower to suit the desired riding style. Preferably, the adjustable bicycle saddle is provided with an adjustment member coupled to the first and second saddle portions to move and retain the rear sections of the first and second saddle portions to change the effective transverse width of the saddle.

8 Claims, 4 Drawing Sheets

ADJUSTABLE BICYCLE SADDLE

BACKGROUND OF THE INVENTION

1. Field of the Invention

This invention generally relates to a bicycle saddle. More specifically, the present invention relates a bicycle saddle that is adjustable in width to suit the desired riding style.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

One component of the bicycle that has been improved over the years is the bicycle saddle or seat. The bicycle saddle is constantly being redesigned to be more comfortable for the rider. Generally, there are two types of saddles that are available on the market. These saddles differ in their width depending upon the desired riding style. For road racing, a narrow saddle is utilized. For leisure riding in the city, a wider bicycle saddle is typically utilized. Typically, a road racing-type of bicycle is equipped with a multi-gear drive train for more high speed riding. Most city bicycles have either a single speed or just a few speeds, and thus, are not designed for high speeds. Of course, many people utilize road racing-type bicycles in the city. During riding in the city, the rider typically is riding at a slower speed. Therefore, a narrow saddle is not necessarily desired for such city bicycling.

Typically, bicycle saddles are made with a predetermined non-adjustable width. Thus, conventional bicycle seats are either wide city-style saddles or narrow road racing-type saddles. Thus, the prior art saddles are not versatile for a bicycle that is used both for city bicycling and road racing-type bicycling. Moreover, since the prior art saddles have a fixed width, they may not be comfortable to all riders. In particular, riders have various hip sizes such that the optimum width of a saddle differs for each individual rider.

In view of the above, there exists a need for an adjustable bicycle saddle which overcomes the above mentioned problems in the prior art. This invention addresses this need in the prior art as well as other needs, which will become apparent to those skilled in the art from this disclosure.

SUMMARY OF THE INVENTION

One object of the present invention is to provide an adjustable bicycle saddle that is adjustable in width.

Another object of the present invention is to provide an adjustable bicycle saddle that is comfortable for a wide range of rider hip sizes.

The foregoing objects can basically be attained by providing an adjustable bicycle saddle comprising an attachment member and a pair of saddle portions being movably coupled relative to the attachment member between at least two different locations to change the effective transverse width of the saddle. The attachment member has a front portion and a rear portion with a longitudinal axis extending between the front and rear portions. The saddle portions have a front section and a rear section with the saddle portions forming an effective transverse width of the saddle.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
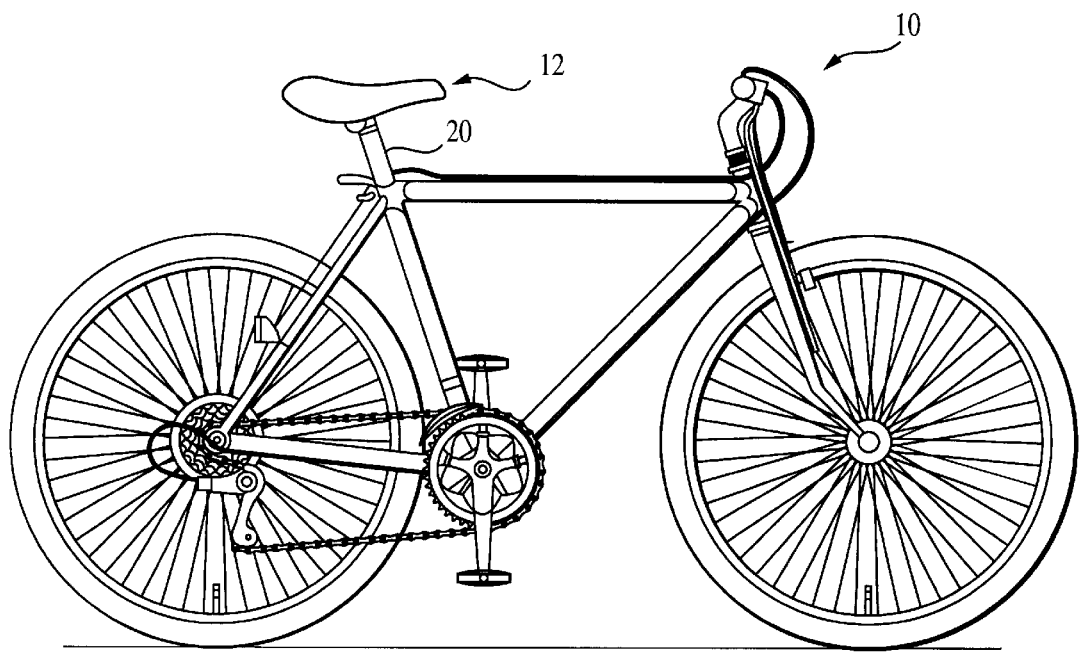
FIG. 1 is a side elevational view of a conventional bicycle with an adjustable bicycle saddle in accordance with a first embodiment of the present invention.
Figure 2:
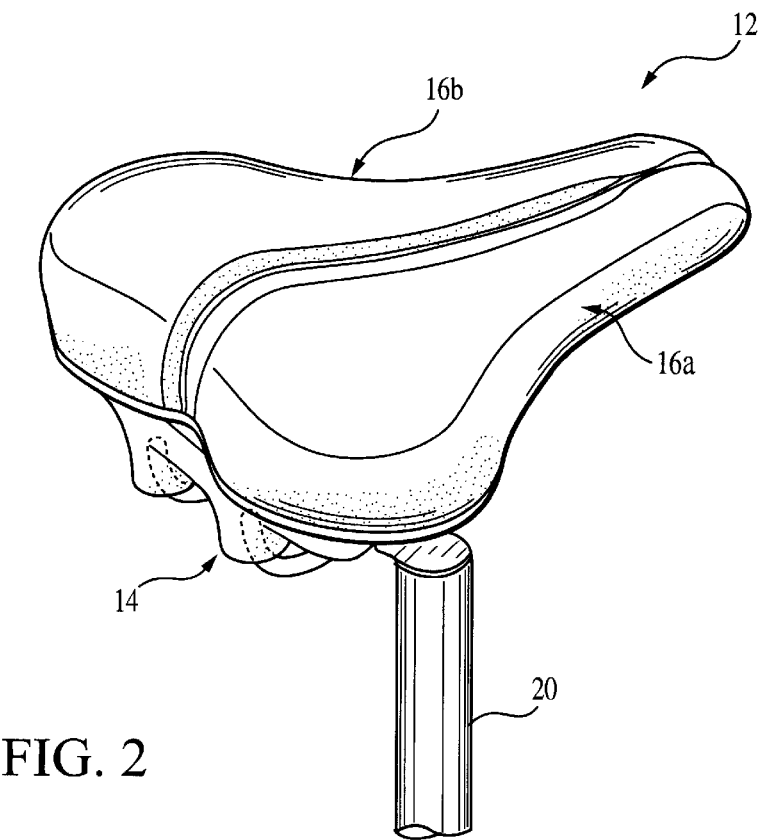
FIG. 2 is a perspective view of the adjustable bicycle saddle illustrated in FIG. 1 in accordance with the present invention.

Referring initially to FIG. 1, a bicycle 10 is illustrated with an adjustable bicycle saddle 12 in accordance with a first embodiment of the present invention as discussed below. Bicycle 10 and its various components are well known in the prior art, except for the adjustable bicycle saddle 12 of the present invention. Thus, bicycle 10 and its various components will not be discussed or illustrated in detail herein, except for the components that relate to the present invention.

As used herein, the following directional terms "forward, rearward, upward, above, downward, vertical, horizontal, below and transverse" as well as any other similar directional terms refer to those directions of a bicycle in its normal riding position, with the adjustable bicycle saddle 12 attached thereto. Accordingly, these terms, as utilized to describe the adjustable bicycle saddle 12 in the claims, should be interpreted relative to bicycle 10 in its normal riding position.

Figure 5:
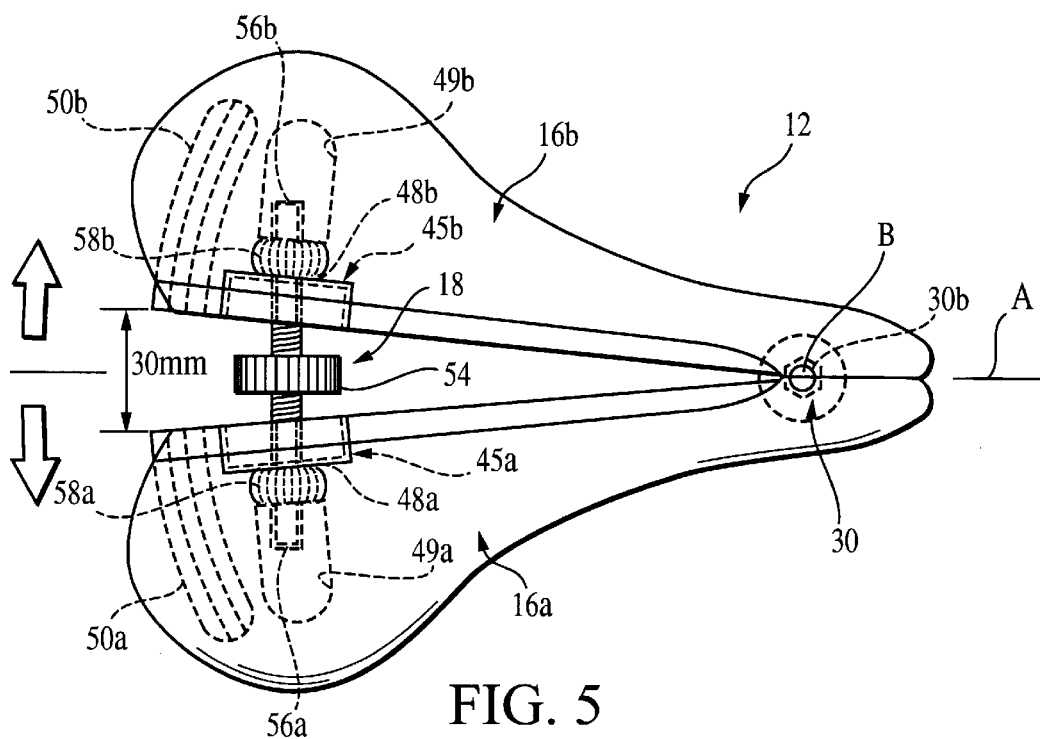
FIG. 5 is a top plan view of the adjustable bicycle saddle illustrated in FIGS. 1–4 in the wide or city mode.

Referring now to FIGS. 2–5, the adjustable bicycle saddle 12 is basically provided with a saddle base or attachment member 14, first and second saddle portions 16a and 16b, and an adjustment member 18. The saddle base 14 is coupled to the seat post 20 of bicycle 10 in a conventional manner as explained below. The first and second saddle portions 16a and 16b are movably coupled relative to the saddle base 14 between at least two different locations, i.e., a sport mode (FIG. 4) and a city mode (FIG. 5). In other words, the saddle 12 can be adjusted to change the effective transverse width of the saddle 12 so as to accommodate the rider's needs. More specifically, the adjustment member 18 is coupled between the first and second saddle portions 16a and 16b to move and retain the first and second saddle portions 16a and 16b in either the sport mode (FIG. 4) or the city mode (FIG. 5). Of course, it will be apparent to those skilled in the art from this disclosure that the effective transverse width of the saddle 12 can be adjusted to one of an infinite number of intermediate positions to accommodate the rider's needs. Preferably, the rear sections of the saddle portions 16a and 16b can be adjusted at least about thirty millimeters outwardly from the sports mode (FIG. 4) to the city mode (FIG. 5).

Figure 3:
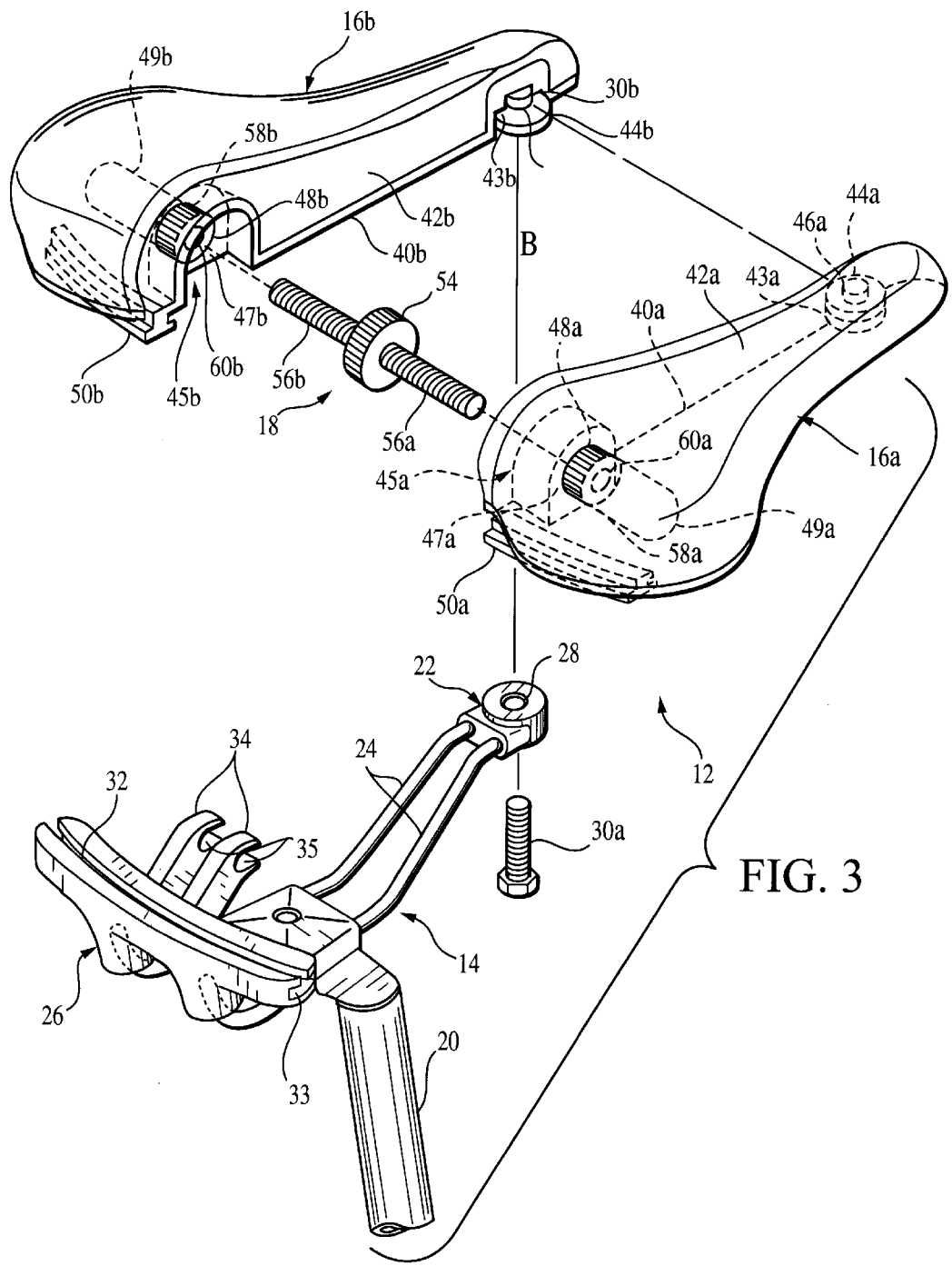
FIG. 3 is an exploded perspective view of the adjustable bicycle saddle illustrated in FIGS. 1 and 2 in accordance with the present invention.
Figure 4:
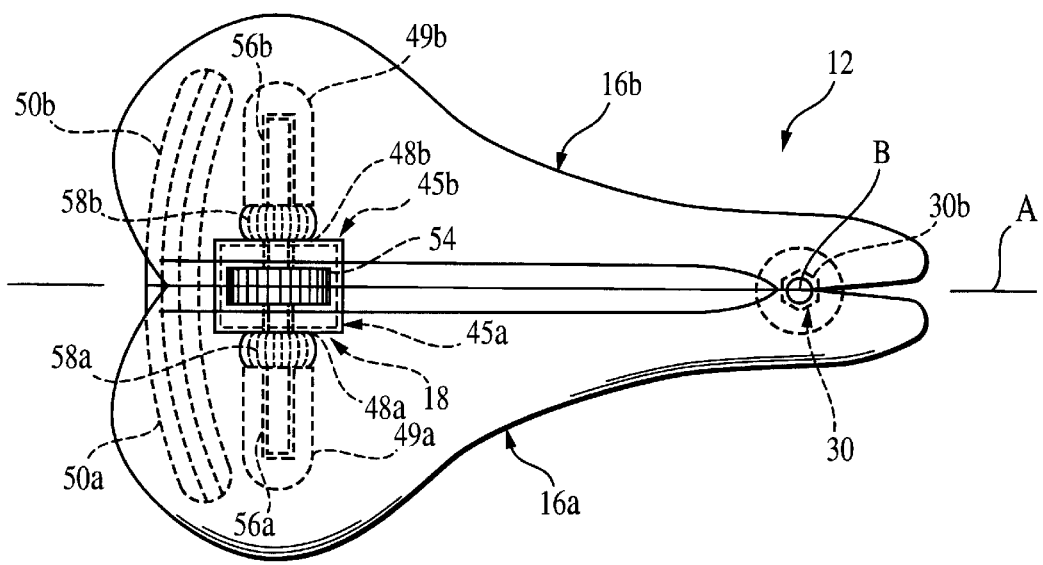
FIG. 4 is a top plan view of the adjustable bicycle saddle illustrated in FIGS. 1–3 with the bicycle saddle in the narrow or sport mode.

As best seen in FIG. 3, the saddle base 14 forms an attachment means for coupling the first and second saddle portions 16a and 16b to the seat post 20 of bicycle 10 in a conventional manner. Of course, it will be apparent to those skilled in the art that the saddle base 14 can have other types of configurations including, but not limited to, an integral seat post. In the illustrated embodiment, the saddle base includes a front portion 22, a pair of mounting rails 24 and a rear portion 26 with a longitudinal axis A extending between the front and rear portions 22 and 26. In use, the longitudinal axis A is typically aligned with the center plane of bicycle 10. The effective transverse width of the saddle 12 is adjusted inwardly and outwardly relative to longitudinal axis A, as will become apparent from the further description of the invention discussed below.

The front section 22 is preferably a lightweight plastic member that is injected molded so as to be integrally formed at the front end of mounting rails 24, as seen in FIG. 3. The front portion 22 has a pivot hole 28 with a substantially vertical axis B. The saddle portions 16a and 16b are pivotally coupled to the saddle base 14 about longitudinal axis B. More specifically, fastener 30 is utilized to pivotally couple the saddle portions 16a and 16b to the saddle base 14. In the preferred embodiment, the fastener 30 is constructed of a threaded bolt 30a and a lock nut 30b.

Figure 6:
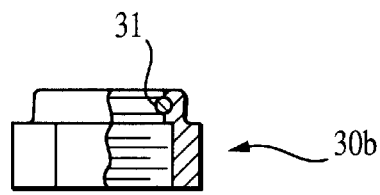
FIG. 6 is an elevational view of the nut for the adjustable bicycle saddle illustrated in FIGS. 2–5 with a portion of the nut broken away for purposes of illustration.

As seen in FIG. 6, the lock nut 30b preferably has a nylon washer 31 that acts as an anti-loosening mechanism, such that the lock nut 30b does not accidentally come off of bolt 30a. It will be apparent to those skilled in the art from this disclosure that the fastener 30 should be slightly loose so that during adjustment of the effective transverse width of the bicycle saddle 12, the saddle portions 16a and 16b can freely pivot about axis B. Of course, the fastener 30 should also be sufficiently tightened to prevent vertical movement between saddle portion 16a and 16b and saddle base 14. It will be apparent to those skilled in the art from this disclosure that other types of fasteners could be utilized instead of fastener 30 for carrying out the present invention.

The rear portion 26 of saddle base 14 is preferably a lightweight plastic member that is injected molded about the rear ends of mounting rails 24 as also seen in FIG. 3. The rear portion 26 basically includes a curved guide channel 32 and a pair of flanges 34. The rear portion 26 of saddle base 14 is slidably coupled to saddle portions 16a and 16b via the guide channel 32, as explained below. The adjustment member 18 is retained at the center of the saddle 12 by flanges 34, as also explained below.

Still referring to FIG. 3, the guide channel 32 has a T-shaped groove 33 that slidably engages saddle portions 16a and 16b. The curvature of groove 33 is preferably arranged such that its center is located at axis B for smooth pivoting action of the saddle portions 16a and 16b, relative to the saddle base 14.

The flanges 34 extend forwardly from the main portion of the rear portion 26 of the saddle base 14. The free ends of flanges 34 have open-ended slots 35 for receiving adjustment member 18 therein, as discussed below.

The saddle portions 16a and 16b are preferably substantially identical to each other except for that they are mirror images of each other. The saddle portion 16a includes a substantially rigid base plate 40a and a soft cushion member 42a fixedly coupled to the upper surface of base plate 40a. Preferably, base plate 40a is constructed of a lightweight substantially rigid plastic material, while cushion member 42a is constructed of dense foam, as is well known in the art.

The base plate 40a is provided with a flange 44a at the front section of saddle portion 16a. This flange 44a is provided with a pivot hole 46a for receiving bolt 30a therein. Preferably, a front recess 43a is located above and below the flange 44a for accommodating a part of saddle portion 16b, as discussed below.

The base plate 40a is provided at the rear section of the saddle portion 16a with a rear recess 45a that includes a substantially vertical plate 47a with an adjustment hole 48a. The cushion member 42a is molded about the rear recess 45a of the base plate 40a and also includes a rear recess 49a that is axially aligned with the adjustment hole 48a for receiving a portion of the adjustment member 18 therein, as discussed below.

The rear section of the base plate 40a is also provided on its bottom surface with a curved guide rail 50a that is received in the groove 33 of the guide channel 32 of the saddle base 14. Accordingly, the guide rail 50a has a shape that corresponds to the groove 33 of the guide channel 32. In the preferred embodiment, the guide rail 50a has a T-shaped cross-section and a curvature that corresponds to the groove 33 of the guide channel 32.

Similar to the saddle portion 16a, the saddle portion 16b includes a substantially rigid base plate 40b and a soft cushion member 42b fixedly coupled to the upper surface of base plate 40b. Preferably, the base plate 40b is constructed of a lightweight substantially rigid plastic material, while cushion member 42b is constructed of dense foam, as is well known in the art.

The base plate 40b is provided with a flange 44b at the front section of saddle portion 16b. This flange 44b is provided with a pivot hole 46b for receiving bolt 30a therein. When the saddle portions 16a and 16b are coupled to the saddle base 14 by the fastener 30, the flange 44a overlaps the flange 44b so that pivot holes 46a and 46b are axially aligned. Preferably, flange 44b is located below flange 44a. In particular, the base plate 40b and the cushion member 42b are shaped to form a front recess 43b located above the flange 44b for accommodating the flange 44a, the nut 30b and the upper end of the bolt 30a.

The base plate 40b is provided at the rear section of the saddle portion 16b with a rear recess 45b that includes a substantially vertical plate 47b with an adjustment hole 48b. The cushion member 42b is molded about the recess 45b of the base plate 40b and includes a rear recess 49b that is axially aligned with the adjustment hole 48b for receiving a portion of the adjustment member 18 therein, as discussed below.

The rear section of the base plate 40b is also provided with a curved guide rail 50b that is received in the groove 33 of the guide channel 32 of the saddle base 14. Accordingly, the guide rail 50b has a shape that corresponds to the groove 33 of the guide channel 32. In the preferred embodiment, the guide rail 50b has a T-shaped cross-section and a curvature that corresponds to the groove 33 of the guide channel 32.

The adjustment member 18 basically includes a control element 54 with a pair of oppositely threaded shafts 56a and 56b extending outwardly therefrom, and a pair of nuts 58a and 58b coupled to the saddle portions 16a and 16b and the ends of the threaded shafts 56a and 56b, respectively. The control element 54 is located between the flanges 34 of the saddle base 14 with threaded shafts 56a and 56b being located in the open-ended slots 35. Thus, the flanges 34 prevent the rear sections of the saddle portions 16a and 16b from moving laterally relative to longitudinal axis A. Preferably, the control element 54 is a wheel-shaped flange with a textured or grooved outer surface. The threaded shafts 56a and 56b are oppositely threaded. In other words, the first threaded shaft 56a has a right-hand thread, while the second threaded shaft 56b has a left-hand thread.

The nuts 58a and 58b of the adjustment member 18 are positioned in the rear recesses 49a and 49b of the cushion members 42a and 42b such that the threaded holes 60a and 60b of the nuts 58a and 58b are aligned with the adjustment holes 48a and 48b of the base plates 40a and 40b. The threaded holes 60a and 60b of the nuts 58a and 58b are oppositely threaded so as to be threadedly coupled to their respective threaded shafts 56a and 56b of the adjustment member 18. The outer surfaces of the nuts 58a and 58b are preferably partially spherically shaped (convexly curved in the direction of their axes) with longitudinally extending outer grooves. The outer surfaces of the nuts 58a and 58b engage the inner surfaces of the adjustment holes 48a and 48b so that the nuts 58a and 58b do not rotate about the axes of holes 60a and 60b with respect to the base plates 40a and 40b. In particular, the inner surfaces of the adjustment holes 48a and 48b are partially spherically shaped (convexly curved in the direction of their axes) with longitudinally extending outer grooves. Thus, the nuts 58a and 58b do not rotate about the axes of holes 60a and 60b with respect to the base plates 40a and 40b. However, the nuts 58a and 58b can pivot in the direction of its outer grooves. In other words, the nuts 58a and 58b can pivot about axes that are perpendicular to the axes of holes 60a and 60b.

SECOND EMBODIMENT

Figure 7:
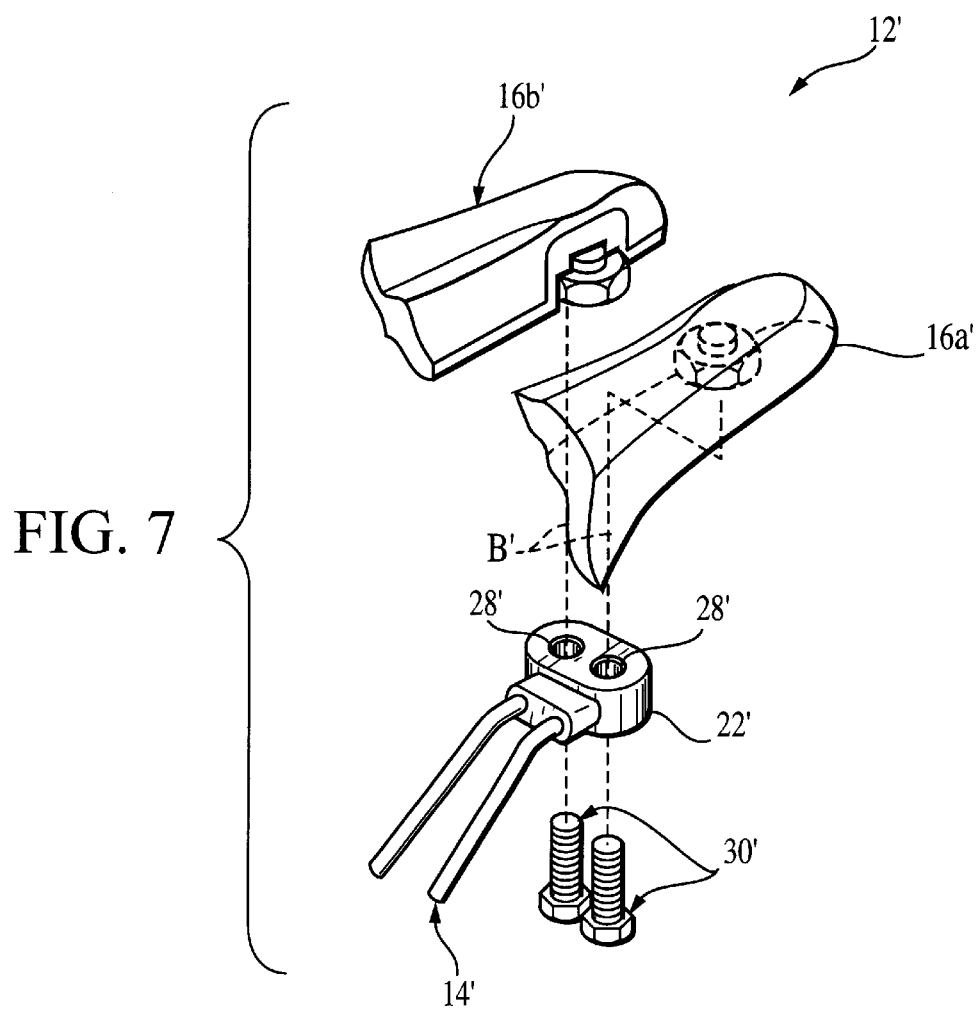
FIG. 7 is a partial, exploded perspective view of an adjustable bicycle saddle in accordance with a second embodiment of the present invention.

Referring now to FIG. 7, a portion of an adjustable bicycle saddle 12' in accordance with a second embodiment of the present invention is illustrated. This embodiment is substantially identical to the first embodiment, except for the structure of the pivoting of the front portion of the saddle 12'. In view of the similarities between this embodiment and the prior embodiment, this embodiment will not be discussed or illustrated in detail herein. Rather, it will be apparent to those skilled in the art from this disclosure that the remaining structure that is not illustrated in the second embodiment is identical to the first embodiment.

In the second embodiment, the attachment member or saddle base 14' has a front portion 22' with a pair of pivot holes 28' and the saddle portions 16a' and 16b' are each provided with pivot holes in their base plates 40a' and 40b' that are designed not to be axially aligned. Therefore, a pair of fasteners 30' are utilized to pivotally couple the saddle portions 16a' and 16b' to the saddle base 14'. The fasteners 30' are identical to the fastener 30, discussed above. Therefore, fasteners 30' will not be discussed or illustrated in detail herein. Accordingly, the second embodiment only differs from the first embodiment in that a pair of pivot axes B' are formed such that each of the saddle portions 16a' and 16b' pivot about its own longitudinal axis B'. Preferably, the longitudinal axes B' are parallel to each other.

The terms of degree such as "substantially", "about" and "approximately" as used herein mean a reasonable amount of deviation of the modified term such that the end result is not significantly changed. These terms should be construed as including a deviation of ±5% of the modified term if this would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An adjustable bicycle saddle comprising:
    an attachment member having a front portion and a rear portion with a longitudinal axis extending between said front and rear portions; and
    first and second saddle portions having a front section and a rear section with said first and second saddle portions forming an effective transverse width of said saddle, said first and second saddle portions being movably coupled relative to said attachment member between at least two different locations to change said effective transverse width of said saddle;
    said attachment member including a guide channel, and each of said first and second saddle portions includes a guide rail slidably coupled to said guide channel;
    said attachment member further including a pair of mounting rails extending between said front and rear portions of said attachment member, said rear portion of said attachment member being formed by said guide channel and said front portion of said attachment member being pivotally coupled to said first and second saddle portions.

2. An adjustable bicycle saddle according to claim 1, wherein
    said attachment member further includes an adjustment member that provides continuous adjustment of an effective transverse width of said saddle over a predetermined range of adjustment.

3. An adjustable bicycle saddle according to claim 2, wherein
    said range of adjustment is at least approximately thirty millimeters.

4. An adjustable bicycle saddle according to claim 2, wherein -
    said adjustment member includes at least one threaded shaft and at least one nut operatively coupled between said first and second saddle portions.

5. An adjustable bicycle saddle according to claim 2, herein
    said adjustment member includes a control element with a pair of oppositely threaded shafts extending outwardly therefrom, and fist and second nuts coupled between said first and second saddle portions and said threaded shafts.

6. An adjustable bicycle saddle according to claim 1, wherein
    said front sections of said first and second saddle portions are pivotally coupled to said attachment member about a single pivot axis.

7. An adjustable bicycle saddle according to claim 1, wherein
    said front sections of said first and second saddle portions are pivotally coupled to said attachment member about a pair of separate pivot axes.

8. An adjustable bicycle saddle according to claim 1, wherein
    each of said first and second saddle portions includes rigid base plate and a cushion member coupled to said rigid base plate.

* * * * *